United States Patent [19]

Swan

[11] 4,323,124
[45] Apr. 6, 1982

[54] METHOD OF INHIBITING GRAVEL PACK AND FORMATION SANDSTONE DISSOLUTION DURING STEAM INJECTION

[75] Inventor: Philip G. Swan, Fountain Valley, Calif.

[73] Assignee: Sigma Chemical Corporation, Santa Ana, Calif.

[21] Appl. No.: 183,147

[22] Filed: Sep. 2, 1980

[51] Int. Cl.³ .................. E21B 43/22; E21B 43/24
[52] U.S. Cl. .................. 166/303; 166/278; 166/305 R; 252/8.55 R
[58] Field of Search ............... 166/276, 278, 272, 294, 166/295, 303, 305 R; 210/170, 193, 777; 252/8.55 D, 8.55 R; 405/264

[56] References Cited

U.S. PATENT DOCUMENTS

| | | | |
|---|---|---|---|
| 2,218,025 | 10/1940 | Garrison et al. | 166/278 |
| 2,246,725 | 6/1941 | Garrison | 166/294 X |
| 2,345,713 | 4/1944 | Moore et al. | 166/305 R |
| 2,366,078 | 12/1944 | Williams | 166/278 |
| 2,765,851 | 10/1956 | Bond | 166/305 R |
| 3,148,199 | 9/1964 | De Groote et al. | 252/8.55 D X |
| 3,329,205 | 7/1967 | Brown | 166/278 |
| 3,438,443 | 4/1969 | Prats et al. | 166/305 R |
| 4,114,691 | 9/1978 | Payton | 166/276 |
| 4,232,740 | 11/1980 | Park | 166/276 |

*Primary Examiner*—Stephen J. Novosad
*Assistant Examiner*—George A. Suchfield
*Attorney, Agent, or Firm*—Philip M. Hinderstein

[57] ABSTRACT

A method of inhibiting dissolution of the gravel pack and/or erosion of the formation standstone in a well bore subject to water or steam injection. The method includes the addition of a material to the surface of the gravel or formation which is capable of adhering to such surfaces and forming a tenacious water-repellent film. The film is monomolecular and hydrophobic. The active ingredient in the chemical treatment is commercial soybean lecithin. The material is added to the surfaces by injecting a liquid solution of the chemical down the annulus of the well during steaming and/or physically precoating the gravel pack by soaking it in a liquid solution of the chemical.

23 Claims, 1 Drawing Figure

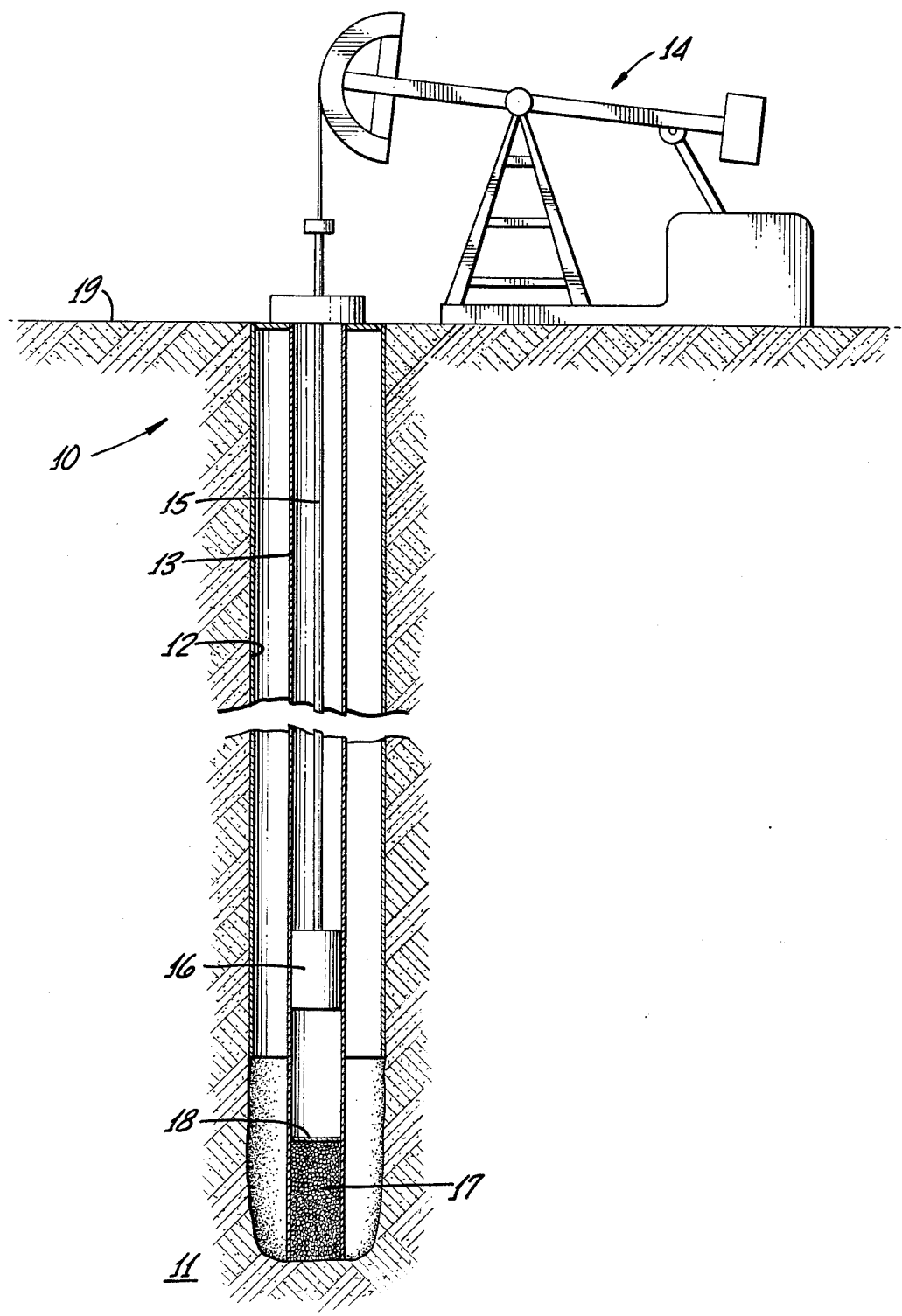

METHOD OF INHIBITING GRAVEL PACK AND FORMATION SANDSTONE DISSOLUTION DURING STEAM INJECTION

BACKGROUND OF THE INVENTION

1. Field of the Invention

The present invention relates to a method for inhibiting gravel pack and formation sandstone dissolution during steam or water injection and, more particularly, to a method for protecting the gravel pack liner used in oil wells being subjected to increased recovery techniques using steam as a driving force as well as a method for protection of the face of the producing zone involved in these techniques.

2. Description of the Prior Art

In the production of crude oil from wells, various techniques have been used to enhance recovery past that which is possible through normal well pressures. These techniques, which are collectively referred to as "secondary recovery", include water flooding, steam stimulation and fire flooding. The success of these techniques, together with the need to increase domestic oil production, has led to the expanded use thereof in the oil fields.

Steam stimulation and steam flooding are techniques generally used in reservoirs of high-viscosity oil. The techniques involve injection into the well of steam of high temperature (approximately 500° F.) in cycles of thousands of cubic meters at a time. The quality of this steam generally ranges from 60–80%, meaning that large quantities of liquid water are concurrently injected into the well bore with the steam.

A typical oil well consists of a casing which lines the inside surface of the well bore and a length of tubing which extends downwardly through the casing. The casing serves to protect the tubing in the event of damage to the latter. Sucker rods extend through the tubing and terminate in a pump which reciprocates in the tubing and forces the oil upwardly therethrough. The lower end of the tubing extends into the oil zone and has perforations therein through which the oil flows thereinto.

Many wells which are subjected to steam stimulation have the lower end of the tubing filled with a gravel pack. A liner is positioned on top of the gravel pack and serves as a seat for the oil pump. The function of the gravel pack is to filter and prevent sand from being produced with the well fluid. The sand is erosive and if not filtered, would damage the pump. The gravel used to pack the well consists of granular sand grains. This material is principally quartz or silica.

Silica has a very low solubility in water at neutral pH and low temperatures, but this solubility rises sharply as temperature and pH are increased. For pH values above 11.0 and temperatures above 177° C., the dissolution rates are orders of magnitude higher than at neutral/ambient conditions.

The liquid water produced in a steam generator generally has a pH in excess of 11.0. Coupled with the high liquid temperatures, the fluid is capable of rapidly dissolving the gravel pack. In the event of failure of the gravel pack, the well begins to produce sand with the eventual shut-down of the well.

Not only is the rate of silica dissolution quite rapid, but the water in the well becomes saturated within a short distance from the point at which the fluid contacts the surface of the silica. This is significant in that the dissolution of silica tends to be localized rather than diffused over a wide area of the zone, resulting in the face of the zone receding significantly.

In addition to the dissolution of the gravel pack due to the large quantities of water injected, there is a danger of the face of the sandstone zone being eroded. If this occurs to a sizeable extent, formation caving in and even tubing or casing collapse could result, resulting in the loss of the well.

Still further, these large silica losses at the well bore may precipitate out as the fluid reaches supersaturated conditions as it passes through the zone. The precipitation of the silica in the zone may result in loss of zone permeability and a resultant shutin.

The costs resulting from such well failures are imposing. Recently, one large oil producer estimated a well failure rate of 34% due to failure of gravel packing or zone related problems due to steaming. The approximate cost of reworking a well presently runs over $40,000. Reducing the cycle by even one day would realize significant savings.

Dissolution of the gravel pack has been shown to be primarily a function of the pH and temperature of the injected liquid-phase water. Consequently, prior attempts at solution of the problem have focused on these aspects. For example, by keeping the pH of the injected hot water below 9.5, gravel pack dissolution can be decreased sharply. This may be accomplished by (1) selection of feedwaters having low $HCO_3^-$ ion concentrations ($<10$ mg $HCO_3^-$/L), (2) treating the feedwater with HCl to yield the desired effluent pH, or (3) using a total deionizer to remove both cations and anions from the feedwater.

With regard to the first proposed solution, selection of feedwaters is often impractical as the large quantities of water used are not available from a choice of sources. With regard to the second proposed solution, the use of HCl to neutralize the bicarbonate alkalinity suffers from considerations of cost as well as feasibility of the method. That is, addition of too much acid will cause severe corrosion of the steam generator and too little will result in insufficient depression of the pH to alleviate silica loss. With regard to the third proposed solution, the cost of a total deionizer is prohibitive, both in terms of capital costs as well as daily maintenance costs.

Even if any or all of these methods were satisfactory in reducing the pH to a level at which the gravel pack dissolution was abated, studies have shown that the sandstones of the zone are comprised of materials which will dissolve at these high temperatures even at neutral pH. As a result, regardless of gravel pack protection by lowering the pH of the hot water which accompanies the steam, large volumes of well bore surface may be eroded.

SUMMARY OF THE INVENTION

The dissolution of silica from the gravel pack as well as the well bore area is caused by a chemical reaction between silica and water which is catalyzed by heat and alkalinity. According to the present invention, this dissolution is inhibited by creating a physical barrier to the reaction on the surface of the silicious material. The barrier is a monomolecular film which does not modify the shape of the individual gravel particles nor affect the permeability of the zone by leaving plugging residues on the well face.

The film is formed by injecting into the steam and water a chemical dissolved in solvent which disperses in the water phase and is carried down the well where it forms a film on the silicious surface and any surface with which it comes into contact, including the well bore face. Alternatively, or additionally, the gravel pack may be physically precoated by soaking it in a liquid solution of the chemical. In either event, the nature of the film is hydrophobic so that water is repelled from the silicious surface. Since there is no contact between reactants, no chemical dissolution may occur. As there is no temperature or pH dependence on the nature of the barrier during normal operating conditions, the previous attempts at solution to the problem are of no consequence. According to the preferred embodiment of the invention, the active ingredient in the chemical treatment is commercial soybean lecithin.

OBJECTS, FEATURES AND ADVANTAGES

It is, therefore, an object of the present invention to protect the gravel pack liner used in oil wells being subjected to increased recovery techniques using steam as a driving force. It is another object of the present invention to protect the face of an oil well producing zone being subjected to increased recovery techniques using steam as a driving force. It is a feature of the present invention to achieve these objects by creating a monomolecular, hydrophobic film on the surface of the silicious material so that water is repelled from the silicious surface. An advantage to be derived is that gravel pack and formation sandstone dissolution during steam injection is substantially inhibited. A further advantage is that the cost of secondary recovery in oil wells is substantially reduced as a result of minimizing well failure costs, minimizing the costs associated with formation caving, reducing steaming costs, and the relatively low treatment costs. A still further advantage is the ease of application of the present chemical treatment. Another advantage is that the treatment may be added to wells already in the process of steaming. Still another advantage is the effectiveness of the present invention. Another advantage is the protection of a well zone from chemical dissolution.

Still other objects, features and attendant advantages of the present invention will become apparent to those skilled in the art from a reading of the following detailed description of the preferred embodiment constructed in accordance therewith, taken in conjunction with the accompanying drawing wherein:

BRIEF DESCRIPTION OF THE DRAWING

The sole FIGURE is a schematic cross-sectional view of an oil well showing the significant elements thereof, useful in explaining the significance of the present invention.

DESCRIPTION OF THE PREFERRED EMBODIMENT

Referring now to the drawing, there is shown a schematic representation of a conventional oil well, generally designated 10. Well 10 includes a bore which is drilled from the land surface 19 to the oil producing zone 11. The well bore is typically lined with a metal casing 12 and lengths of tubing 13 extend through casing 12, from surface 19 to production zone 11. A pumping station 14 positioned on surface 19 is connected to one end of a string of sucker rods 15 which extend downwardly through tubing 13 to zone 11. Connected to the lower end of sucker rods 15 is a pump 16 which draws oil through perforations in the lower end of tubing 13 and pumps it up to surface 19 through tubing 13.

In wells in which production zone 11 contains a good deal of sand, the lower end of tubing 13 is generally completed with a gravel pack 17 which is covered with a liner 18 which serves as a seat for pump 16. The function of gravel pack 17 is to filter and prevent sand from being produced with the well fluid. The gravel used to pack well 10 consists of granular sand grains. This material is principally quartz or silica.

Steam stimulation and steam flooding are techniques generally used for secondary recovery in reservoirs of high viscosity oil. During a steaming operation, well 10 is shut down and steam is injected down through tubing 13, through gravel pack 17 and the perforations in tubing 13 into zone 11. As discussed previously herein, the liquid water produced during steam generation is capable of rapidly dissolving gravel pack 17. In addition to the dissolution of gravel pack 17 due to the large quantities of water injected, there is a distinct danger of the face of zone 11 being eroded. If this occurs to a sizeable extent, formation caving and even tubing 13 or casing 12 collapse could result.

The dissolution of silica from gravel pack 17, as well as zone 11, is caused by a chemical reaction between silica and water which is catalyzed by heat and alkalinity. According to the present invention, both gravel pack 17 and the face of zone 11 are protected from this dissolution by creating a physical barrier to the reaction on the surface of the silicious material. This barrier is preferably a monomolecular film which does not modify the shape of the individual gravel particles and does not affect the permeability of zone 11 by leaving plugging residues on the face of zone 11. That is, if the barrier formed by the present invention was not a monomolecular film, one layer of film would tend to build up on another, which would eventually modify the shape of the individual gravel particles and cause a buildup of a gummy residue which would tend to reduce the permeability of zone 11. This is prevented according to the teachings of the present invention.

The nature of the film produced by the present invention is hydrophobic so that water is repelled from the silicious surface. Since there is no contact between the reactants, namely the silica and the water, no chemical dissolution may occur. Furthermore, according to the present invention, as there is no temperature or pH dependence on the nature of the barrier during normal operating conditions, the previous attempts at solution to the dissolution problem are of no consequence.

It is the teaching of the present invention to add a material to the surface of gravel pack 17 or the face of zone 11 which is capable of adhering to such surfaces and forming a tenacious water-repellent film. Once achieved, such a film will prevent chemical erosion of the silica surface by not allowing the reactants to come into contact. The material may be added to these surfaces in various ways. In the case of gravel pack 17, the gravel may be physically precoated by soaking gravel pack 17 in a liquid solution of the present chemical composition. Thereafter, gravel pack 17 may be inserted into tubing 13 in a conventional way. Whether or not gravel pack 17 is precoated, the material may be added to gravel pack 17 and the surface of zone 11 by injecting a liquid solution of the chemical composition down tubing 13 during the steaming operation.

Experiments have shown that the injection of the present chemical composition down tubing 13 involves treatment of the liquid portion of the steam at a preferred rate of 80-100 ppm by volume of the liquid chemical composition. If a lower concentration of the liquid chemical is used, it is found that coating is not adequately effective. Any greater concentration appears to be unnecessary. In any event, the chemical composition consists of the active coating material at a concentration of 5%-95%, preferably 10%-30%; solubilizers or dispersants at a concentration of 5%-35%, preferably 5%-15%; and the remainder a solvent carrier to provide fluidity, pourability and ease of handling.

The active coating material in the chemical composition is lecithin. Lecithin is uniquely suitable for this purpose because it creates a monomolecular film and it is hydrophobic. Experiments have shown that lecithin forms a tenacious film on the silicious materials with which it comes into contact. Lecithin is highly surface active and can form stable emulsions in a water phase, yet yield a hydrophobic barrier on a surface. While other materials possess this property, they do not do so at the high temperatures faced in steaming operations. Lecithin has a melting point of 236°-7° C., above that of steam temperatures. Other fatty-type filming agents have wide liquid ranges, but have little surface attraction or stability at the temperatures encountered. Lower molecular weight filming agents would partition to the gas phase and not come into contact with the silicious surfaces.

Lecithin is a phosphorus-containing liquid, that is, a phosphatide found in all living organisms, both plant and animal. It consists of glycerol combined with two fatty acid radicals, phosphoric acid and choline, hence there may be many lecithins or phosphatidylcholines depending on the nature and disposition of the fatty acid groups. In commercial practice, however, the term lecithin refers to a mixture of acetone-insoluble phosphatides, including "true lecithin" and cephalin, together with other substances such as carbohydrates, glyceride oils, and sterols that occur with the phosphatides.

The lecithin of commerce and of technical importance is predominantly soybean lecithin. Relatively small quantities of lecithin from corn, peanut, and rapeseed are produced and work has been done on the possibility of utilizing cottonseed lecithin, castor-seed lecithin, and even coffee lecithin, which can be obtained as a by-product in the decaffeinization of green coffee. Egg lecithin is of some importance for pharmaceutical purposes but is manufactured in relatively small quantities owing to its high price. Small quantities of synthetic phosphatides are manufactured occasionally, but unless they have some really important function, they do not stay on the market for very long because they cost more to make than soybean lecithin. It is soybean lecithin that has been tested and proved according to the teachings of the present invention.

True lecithin is a surface active material which will emulsify in water. However, soybean lecithin needs dispersants to aid in emulsification. These dispersants may be nonionic or ionic surfactants, and many commercial products are capable of emulsifying lecithin. Examples of such surfactants are ethoxylated nonyl phenols, fatty organic phosphates, fatty organic sulfonates, and ethoxylated fatty amines.

Whereas the present invention involves the procedure of producing a film of lecithin upon the surfaces to be protected, lecithin may be diluted with any compatible solvent or solvent blend for ease of pumping, dispersibility, or other desirable traits. This solvent or solvent blend may be either oil or water based. Examples of such solvents are water, methanol, isopropanol, chloroform, ethyl acetate, kerosene and diesel.

Although the exact mechanism is not known, when lecithin is used in accordance with the present invention, it is believed to be dispersed in the water phase. The thermal stability of lecithin under these conditions is believed to be derived from the reducing atmosphere present in the steam. The lecithin is then carried with the hot water down tubing 13 to gravel pack 17 and zone 11. Due to the greater attraction of the lecithin for silica, the molecules migrate to the surface of gravel pack 17 to form a monomolecular film. This film has been demonstrated by the use of infrared spectroscopy to be present on gravel that has undergone steaming with the present lecithin treatment.

When the lecithin is injected into the steam, presumably there is partitioning to the water phase. The steam is at a high temperature and pressure. The temperature may run from approximately 500° to 575° F. and the pressure from 700 to 2500 psi. The steam generator may produce saturated steam of 80% quality; however, 60% to 70% is the usual operating range.

The amount of chemical composition added to the steam is not critical, assuming a sufficient amount to fully coat gravel pack 17. Excess lecithin not needed for filming on the gravel surface then carries through gravel pack 17 into zone 11 where the face of zone 11 becomes coated. This treatment would then continue into zone 11 until the concentration is diminished. As there is a monomolecular film present, there is no concern of a build-up of gummy residue which would form and tend to reduce the permeability of zone 11.

While the preferred form of the invention involves the addition of the chemical composition to the steam during a steaming operation, an optional method of application involves the additional soaking of gravel pack 17 in a solution of lecithin before application to well 10. The soaking would be for a period of time long enough to allow a film of the active ingredient to form on the surface of the gravel, i.e. 1-24 hours. This application would precede the continuous treatment in the well as discussed previously. The purpose of such a prior application would be to form a uniform coating on the gravel before steaming is initiated so that a minimum of erosion will occur while the chemical is being injected.

It has been noticed that when injecting the present chemical composition with the steam, there is a lag time between the initial addition of the chemical composition and satisfactory coating of the gravel surfaces. This is due to the hydrophobic nature of lecithin, which tends to film on all metal surfaces in tubing 13. This coating may be advantageous as it may tend to retard corrosion of the well itself.

Numerous advantages immediately flow from the use of the present invention. The present invention is easily applied by initial soaking and continuous feeding and the treatment may be added to wells already in the process of steaming. The present process of steaming is applicable to steam flooding in which steam is continuously injected into wells on the periphery of producing wells. Most importantly, the present method is highly effective. Tests have shown that the treatment is able to reduce silica losses substantially, extending the life of a gravel pack and reducing zone erosion. In addition to reducing silica losses in a gravel pack, the present invention protects a zone from chemical dissolution. As many wells are not gravel packed, the zone would then be the first silica surface to come in contact with the hot alkaline water. No other treatment known offers protection to the zone.

The present invention is highly cost effective. That is, use of the present invention reduces high well failure costs resulting from collapsed casings or liners, high costs resulting from formation caving, and high steaming costs by steaming fewer days at higher quality.

While the invention has been described with respect to the preferred embodiment constructed in accordance therewith, it will be apparent to those skilled in the art that various modifications and improvements may be made without departing from the scope and spirit of the invention. For example, while the present invention has been described in its use for minimizing gravel pack dissolution and zone erosion, the teachings of the present invention obviously have wider applicability. That is, the present invention may be used to protect various types of equipment which are subject to chemical erosion in high temperature applications involving steam and water. One example where the present invention may be applicable is in geothermal energy production. Accordingly, it is to be understood that the invention is not to be limited by the specific illustrative embodiments, but only by the scope of the appended claims.

I claim:

1. A method of inhibiting dissolution of the gravel pack in a well bore subject to stimulation with hot aqueous fluids comprising:
   coating said gravel pack with a chemical composition, the active ingredient in which is lecithin.

2. A method according to claim 1, wherein said active ingredient is commercial soybean lecithin.

3. A method according to claim 2, wherein said coating step comprises:
   injecting a liquid solution of said chemical composition down said well bore.

4. A method according to claim 2 or 3, wherein said coating step comprises:
   soaking said gravel pack in a liquid solution of said chemical composition.

5. A method according to claim 1, wherein said chemical composition consists of said active ingredient, solubilizers or dispersants, and a solvent.

6. A method according to claim 5, wherein the concentration of said active ingredient is 5%–95%, the concentration of said solubilizers or dispersants is 5% to 35%, and the remainder is said solvent.

7. A method according to claim 5, wherein the concentration of said active ingredient is 10%–30%, the concentration of said solubilizers or dispersants is 5% to 15%, and the remainder of said chemical composition is said solvent.

8. A method according to claim 5, 6, or 7, wherein said chemical composition is added to said hot aqueous fluids at a rate of 80–100 ppm by volume of the liquid chemical composition.

9. A method according to claim 5, wherein said solubilizers or dispersants are selected from the group consisting of ethoxylated nonyl phenols, fatty organic phosphates, fatty organic sulfonates, and ethoxylated fatty amines.

10. A method according to claim 5 or 9, wherein said solvent is selected from the group consisting of water, methanol, isopropanol, chloroform, ethyl acetate, kerosene and diesel.

11. A method of inhibiting erosion of the production zone face in a well bore subject to stimulation with hot aqueous fluids comprising:
    coating said zone face with a chemical composition, the active ingredient in which is lecithin.

12. A method according to claim 11, wherein said active ingredient is commercial soybean lecithin.

13. A method according to claim 11 or 12, wherein said coating step comprises:
    injecting a liquid solution of said chemical composition down said well bore.

14. A method according to claim 13, wherein said chemical composition is injected down said well with said hot aqueous fluids.

15. A method according to claim 11, wherein said chemical composition consists of said active ingredient, solubilizers or dispersants, and a solvent.

16. A method according to claim 15, wherein the concentration of said active ingredient is 5%–95%, the concentration of said solubilizers or dispersants is 5% to 35%, and the remainder is said solvent.

17. A method according to claim 15, wherein the concentration of said active ingredient is 10%–30%, the concentration of said solubilizers or dispersants is 5% to 15%, and the remainder of said chemical composition is said solvent.

18. A method according to claim 15, 16, or 17, wherein said chemical composition is added to said hot aqueous fluids at a rate of 80–100 ppm by volume of the liquid chemical composition.

19. A method according to claim 15, wherein said solubilizers or dispersants are selected from the group consisting of ethoxylated nonyl phenols, fatty organic phosphates, fatty organic sulfonates, and ethoxylated fatty amines.

20. A method according to claim 15 or 19, wherein said solvent is selected from the group consisting of water, methanol, isopropanol, chloroform, ethyl acetate, kerosene and diesel.

21. A method of inhibiting dissolution or erosion of a silicious material subject to aqueous fluids at elevated temperatures produced concurrently with steam comprising:
    coating said silicious material with a chemical composition, the active ingredient in which is lecithin.

22. A method according to claim 21, wherein said active ingredient is commercial soybean lecithin.

23. A method according to claim 21 or 22, wherein said chemical composition consists of said active ingredient, solubilizers or dispersants, and a solvent.

* * * * *